Oct. 3, 1967  A. A. EMERSON  3,344,531
MEASURING INSTRUMENT
Filed Jan. 19, 1966  4 Sheets-Sheet 1

INVENTOR.
ALFRED ADOLFE EMERSON
By Kimmel, Crowell & Weaver
ATTORNEYS.

Oct. 3, 1967         A. A. EMERSON         3,344,531
                    MEASURING INSTRUMENT
Filed Jan. 19, 1966                    4 Sheets-Sheet 2

INVENTOR.
ALFRED ADOLFE EMERSON
By Kimmel, Crowell & Weaver
        ATTORNEYS.

Oct. 3, 1967     A. A. EMERSON     3,344,531

MEASURING INSTRUMENT

Filed Jan. 19, 1966     4 Sheets-Sheet 3

INVENTOR.
ALFRED ADOLFE EMERSON
BY Kimmel, Crowell & Weaver
ATTORNEYS.

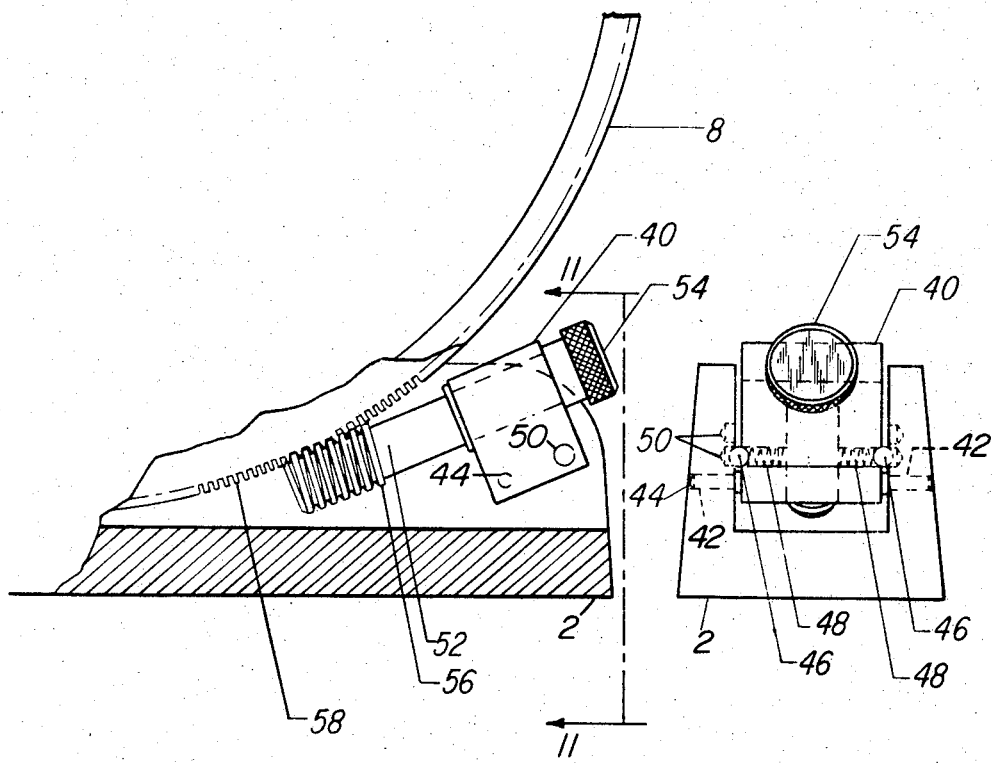

United States Patent Office 3,344,531
Patented Oct. 3, 1967

3,344,531
MEASURING INSTRUMENT
Alfred Adolphe Emerson, 2667 Midland Ave., Agincourt, Toronto, Ontario, Canada
Filed Jan. 19, 1966, Ser. No. 521,596
7 Claims. (Cl. 33—88)

ABSTRACT OF THE DISCLOSURE

A combined level and angle finding instrument comprising a base having a dial casing rotatably mounted thereon, lock means and a micrometer adjustment for the dial, a plumbing needle, a protractor scale and a bubble level mounted in the dial casing, one embodiment including a bracket in the dial casing for mounting a removable scale.

---

Figure 1:
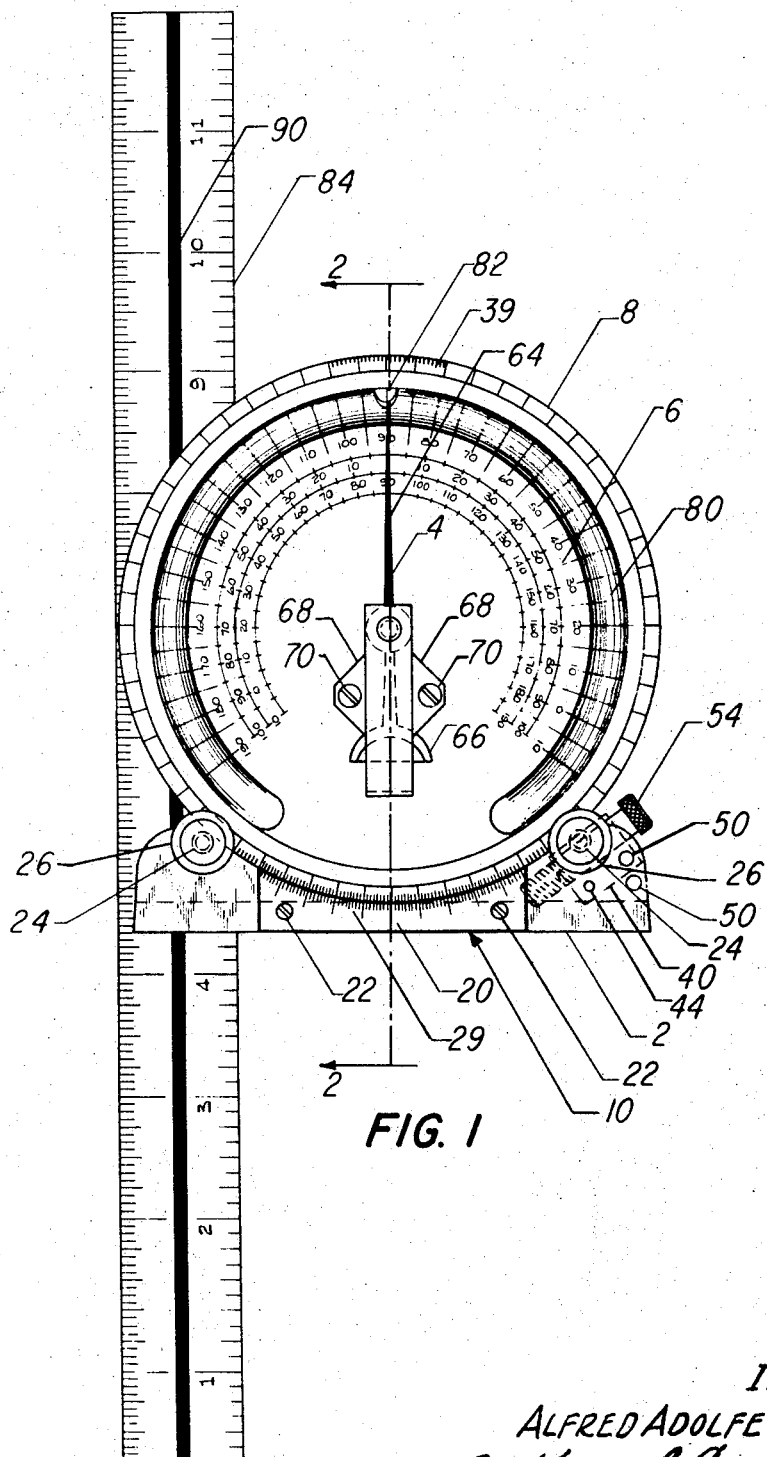

The present invention relates to a measuring instrument or unit, and particularly to a shock-proof, water-proof, nonmagnetic unit useful as a level and as an angle finder, and which may be used also as a square and automatic angle computer.

The determination of correct and precise angles and levels during machine shop procedures, and construction site operations is of utmost importance, if a satisfactory product is to be obtained. The unit of the present invention which supplies accurate angle measurements quickly reduces operator set-up time and minimizes errors which often result from a hurried operator's personal computations, resulting in increased output and with fewer rejects and hence a more economically produced product.

The present unit is useful as a standard level in either a vertical or horizontal plane. In addition it is useful as a finder of the angle of any obliquely positioned plane and in this respect is of great value to a craftsman in determining respective angles of two or more surfaces or work pieces. With modification the present unit is useful as a set or variable angled square.

The unit consists basically of a flattened base portion, and a plumbing needle and protractor scale within a dial casing carried by the base and rotatably mounted thereon, and means for securing the dial casing against rotational movement with respect to the base. In addition the dial casing may carry a level glass with bubble as confirmation of the plumb indicated by the plumbing needle, and may additionally be provided with micrometer adjustment means for precise regulation of amount of rotation of dial casing with respect to the base member, and be provided with vernier scales on the base member for correlation with degree and minute increments inscribed on the circular dial casing. In another embodiment the dial casing is provided with a bracket for carrying a removable scale to lend further application as a set or variable angled square.

The main object of the present invention is to provide a compact, durable, shock-proof, water-proof, non-magnetic combination level and angle finding unit, and a further object to provide an angle finding combination unit having micrometer adjustment means and vernier scales for precise angle measurements.

It is a further object to provide a combination unit having a pivotally mounted plumbing needle for accurate level determinations, and a protractor scale carrying three scales for simultaneously determining elevation angle (left or right) and inclusion and exclusion angles by the positioning of the plumbing needle with respect to the scales.

It is still a further object to provide a combination level and angle detecting unit comprising a circular casing, containing a plumbing needle and a protractor scale, carried by a base member and in rotatable relationship therewith, and means to secure the casing in fixed position with respect to the base; and another object to provide a said unit with micrometer adjustment means and vernier scales.

Another object is to provide a combination unit carrying a bracket to which a scale or ruler may removably be attached to increase the versatility of the unit, and a further object to provide a said unit in combination with a level glass with bubble in confirmation of reading registered by the plumbing needle.

Figure 3:
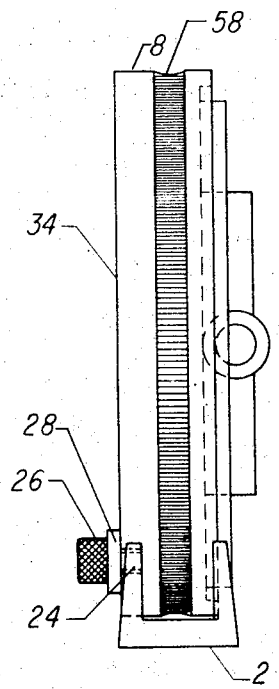
Figure 2:
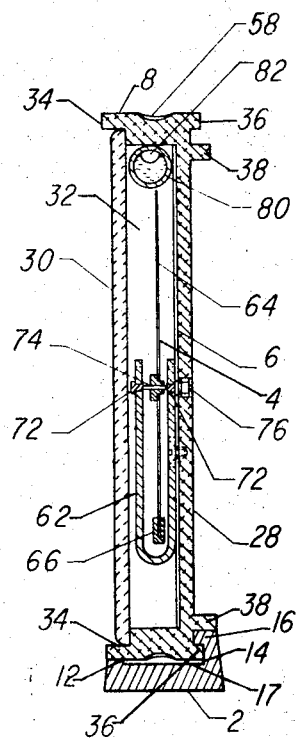
Figure 4:
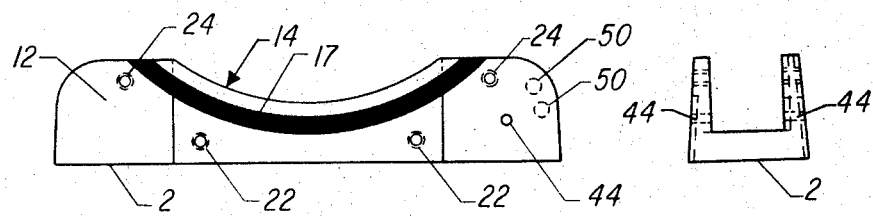
Figure 6:
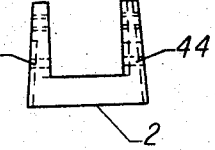
Figure 5:
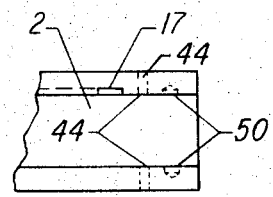
Figures 8, 9:
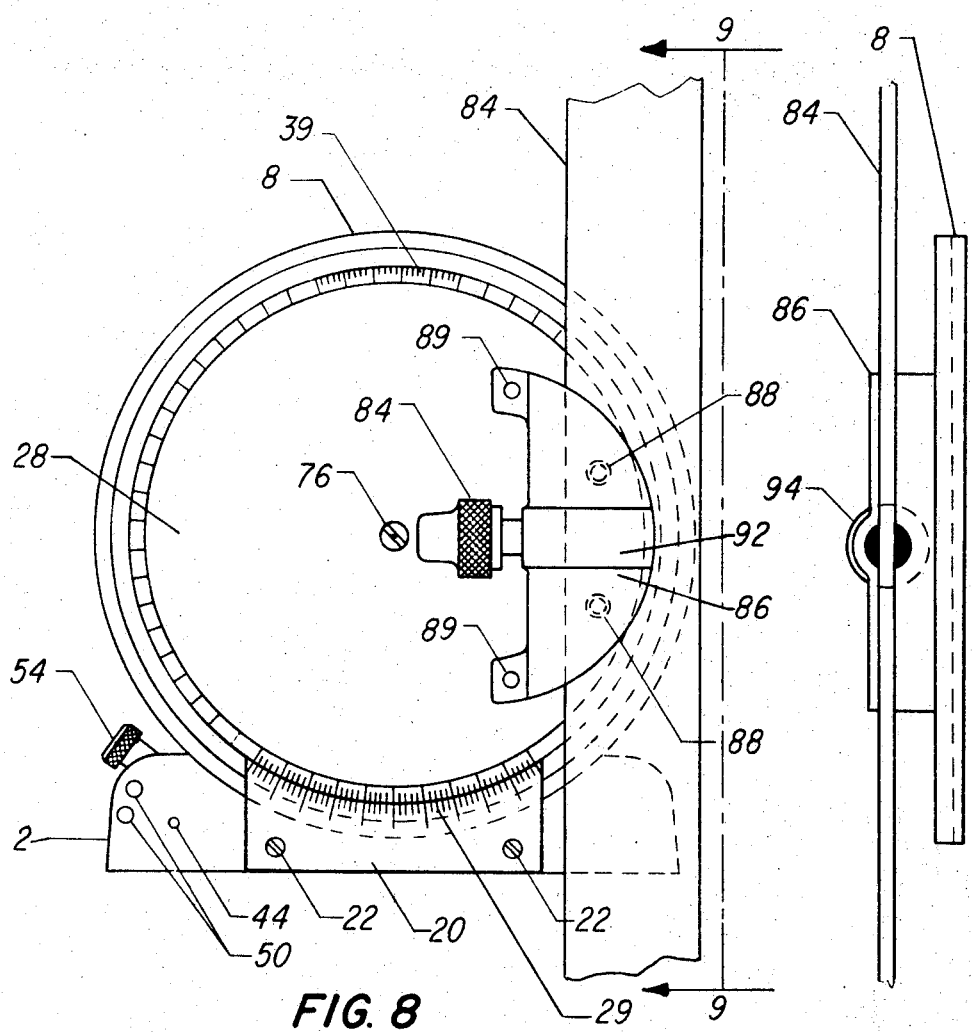
Figure 7:
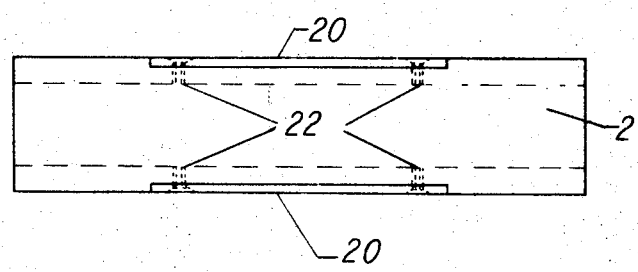

These and other objects will become apparent from the following description taken in conjunction with the accompanying drawings, wherein:

FIGURE 1 is a front view of the combination measuring set according to the present invention, FIGURE 2 is a sectional view taken along line 2—2 of FIGURE 1, FIGURE 3 is a side view of the device, of FIGURE 1, as viewed from the right and having the micrometer adjustment means removed for clarity, FIGURE 4 is a front view of the dial supporting base shown in FIGURE 1, FIGURE 5 is a partial top view of the base shown in FIGURE 4, FIGURE 6 is an end view of the base shown in FIGURE 4, FIGURE 7 is a bottom view of the supporting base shown in FIGURE 4, FIGURE 8 is a rear view of the combination set according to the present invention, FIGURE 9 is a partial side view of the device taken along line 9—9 of FIGURE 8, FIGURE 10 is an enlarged sectional view of the micrometer adjustment means shown in FIGURE 1, and FIGURE 11 is an enlarged view of the micrometer adjustment means in the direction of arrows 11—11 in FIGURE 10.

A front view of the combination level and angle finder unit is shown in FIGURE 1, and consists basically of a supporting base member 2 carrying a plumb needle 4 and protractor scale 6 encased within circular dial casing 8.

The supporting base member 2 has a flattened and smooth lower surface 10, and two upstanding side walls extending throughout its length, the height of the side walls being greater at the ends of the base decreasing in height toward the center of the base in the form of a circular arc. The base member is shown clearly in FIGURES 4, 5, 6, and 7 which illustrate front, top, end and bottom views, respectivey. As will be seen in FIGURE 4 which is a front view of the base 2 identical with that shown in FIGURE 1, the height of the front wall 12 defined by a circular arc being less than the height of the back wall 14 defined by an equal radius circular arc. This is also shown in FIGURE 2.

The back wall 14 of the base 2 is provided with an inwardly directed flange 16 which follows the circular height contour of the back wall 14, defining an arched groove 17 to receive a circular flange 36 provided on the ring casing 8 (see FIGURE 2). Both sides of the base member 2 may also be recessed to receive plates 20 bearing a vernier scale as shown in FIGURES 1, 7 and 8. The plates 20 being fastened onto the base 2 by means of screws 22.

The front wall 12 of the base member is provided with two tapped holes 24 to receive the threaded stud portions of retaining screws 26 provided with shoulders 28.

The dial casing 8 is circular and generally cylindrical in configuration and has a back panel or face 28 and a transparent front face 30 snugly positioned within circular casing 8 to provide a mechanism containing cavity 32.

The front edge of the casing 8 is formed as a circular flange 34, and the rear edge is formed with two circular flanges 36 and 38. The radius of circular casing 8, and flanges 34, 36 and 38 carried thereby, is identical with the radii of the circular configurations formed in walls 12 and 14 of base 2. Thus as the base 2 and casing 8 are assembled together, flange 34 will ride in the circular depression formed in wall 12, and inwardly directed flange 16 on base 2 will fit between flanges 36 and 38 with flange 36 engaging in trough 17 formed in base 2. Thus it will be apparent that casings 2 and 8 snugly fit together, and as all radii are identical it is possible to rotate casing 8 a full 360° within casing 2.

Dial casing 8 is held within base 2, by retaining screws 26 (see FIGURE 3) the threaded portions of which are received in tapped holes 24 provided in the front wall 12 of base 2. As the screws 26 are threaded into holes 24, retaining shoulders 28 contact flange 34 securely locking the casings 2 and 8 together. By loosening screws 26 the dial casing 8 may be rotated through any 360° in respect of base 2, and when appropriately positioned the retaining screws 26 tightened to secure the casing 8 in desired position with respect to base 2.

As outlined above the exterior surfaces of base walls 12 and 14 may be provided with vernier scale plates 20 (see FIGURES 1, 7 and 8), and the outermost surfaces of flanges 34 and 38 divided peripherally into degree or minute increments 39. The scales carried by plates 20 and the increments carried by flanges 34 and 38 cooperate to form a vernier 29 scale on each side of the instrument to substantially increase the accuracy of the instrument.

The dial casing 8 may be rotated in respect of base 2 by hand when the retaining screws are loosened, but in applications where greater accuracy is required a micrometer adjusting means may usefully be employed. Such a micrometer adjusting means is shown in attached FIGURE 1, and in enlarged detailed view in FIGURES 10 and 11. A screw casing 40 is pivotally mounted on shaft or axle 42 extending between the front 12 and back 14 walls of base 2. The ends of shaft or axle 42 are received within apertures or holes 44 in the walls of base 2. The screw casing 40 carries two balls 46 recessed slightly therein, and spring 48 urges the balls outwardly against the interior surfaces of walls 12 and 14. The interior surfaces of base walls 12 and 14 are provided with two sets of ball receiving recesses 50, to receive balls 46 to enable the pivoting and setting of screw casing 40 in one of two positions as will be explained in more detail later.

A shaft 52 is rotatably carried by the screw casing 40, and the shaft 52 is rotatable within the casing 40 by the manual rotation of knob 54. The other end of shaft 54 is provided with a worm gear 56. As clearly shown in FIGURE 3 the outer surface of the ring casing 8 is provided with a series of gearing teeth 58 for meshing engagement with worm 56 carried by shaft 52. The screw casing 40 is pivotable to one of two positions. When balls 46 are in the uppermost set of recesses, the worm 56 is out of engagement with gearing teeth 58, and with retaining screws 26 loosened the dial casing 8 may manually be rotated with respect to the base 2 to the approximate position desired. For finer adjustment the screw casing 40 is pivoted to locate balls 46 in the lowermost set of recesses 50 and to position worm 56 in meshing engagement with gearing 58. Rotation of knob 54 will then impart fine rotational movement to dial casing 8, and when the final setting is reached the retaining screws 26 are tightened to prevent further movement of the dial casing 8 with respect to base 2.

In FIGURE 2 a dial enclosing cavity 32 is formed between ring casing 8, casing panel or wall 28 and transparent front panel 30. Positioned centrally of the cavity is a plumb indicating needle 4 carried by a U-shaped support 62 in which the needle is rotatably mounted. One end of the needle 4 is in the form of a pointer 64 and the other is provided with a plumbing weight 66. The portion of the U-shaped member 62 adjacent the back panel 28 is provided with flanges 68 (see FIGURE 1) through which screws 70 pass to secure the U-shaped member to panel 28. The arms of the U-shaped member 62 carry jewels 72 in which the hardened pointed ends of needle shaft 74 ride to provide substantially friction-free rotation of needle 4. As the plumbing weight 66 is heavier than the pointer 64 portion of needle 4, the needle will always indicate a true plumb due to earth's gravitational forces.

In order to provide some regulation over the needle activity and to control needle dampening, the back panel 28 of casing 28 is provided with a set screw 76 in a tapped hole. By screwing screw 76 inwardly against the back of arm 78 of the U-shaped member 62 above retaining screws 70, arm 78 is displaced ever so slightly inwardly without affecting the remaining portion of U-shaped member 62 to decrease the distance between jewels 72 to increase dampening of needle 4 by action of jewels 72 on the points of needle shaft 74.

Also positioned within cavity 32 adjacent back panel 28 is a protractor scale 6 (see FIGURES 1 and 2) which as shown in FIGURE 1 bears three separate angle scales, all three of which are indicated simultaneously by pointer 64. In FIGURE 1 the outermost scale denotes the elevation angle, and the inner scale the included angle (left or right), and the middle scale the excluded angle (left or right). Thus with the base 2 and dial casing 6 positioned together as shown in FIGURE 1, and with base 2 positioned on a work surface, it is possible to immediately read whether the work surface is level or the amount of degrees it is off level, and to simultaneously read angles of elevation, inclusion and exclusions without further computation.

The cavity may also contain a circular level glass 80 filled with a suitable liquid and containing an air bubble 82 as a plumbing level. The successful use of the present combination unit is not dependent upon the presence of level glass 80 as the plumb pointer 64 will relate more accurate readings. The presence of level glass 80 however does confirm readings given by the pointer if only generally, and adds confidence to the operator of the unit who has through his training become accustomed to levels which contain level glasses.

Another useful embodiment of the present invention is the provision of a removable scale or ruler 84 as shown in FIGURES 1, 8 and 9 to enable the unit to be used as a right-angled square, or to define any angle desired. The scale 84 is removably attached to the back panel 28 of casing 8 by a bracket 86 secured to panel 28 by screws 88 and dowels 89. The scale 84 is provided with a longitudinal recessed groove 90 which receives a flange (not shown) carried by slide 92. As thumb screw 94 is tightened, slide 92 is displaced thus securing scale 84 within bracket 86 by the action of the flange within groove 90.

The elements which comprise the present invention may be made from any suitable material, but for purposes of exemplification the following materials may advantageously be used. The base 2 may be constructed of malleable iron, heat-treated and normalized to resist twisting or warping, and the dial casing 8 may be a pressure cast aluminum housing having pressure fit therein an unbreakable Plexiglas lens 30, and a Plexiglas level tube. The needle 4 may be constructed from any material unaffected by induced magnetic attraction mounted on a hardened, pointed axle 74 positioned in custom made jewels 72, resulting in a strong, shock-proof, water-proof, non-magnetic unit of exceptional durability.

The basic elements of the present unit necessary for its use as a level and/or an angle finder are the flattened base portion, and the dial casing section, rotatably mounted in the base, containing the plumbing needle 4, and protractor scale 6. Further refinements and improvements include the micrometer adjustment means, and the vernier scales carried by the base and inscribed on the flanges of the dial casing. A level tube 80 may also be present. The provision of removable scale 84 increases the usefulness of the present device, and allows its use as a square set or variable angle set.

The present unit has many advantages around the machine shop, construction site, and any task requiring accurate level and angle determinations and while some specific applications of the present invention are listed below the usefulness of the unit is not restricted to such applications, and the protection requested should be limited solely to the scope of the appended claims.

To machine an angle on a piece of stock the usual procedure employs a considerable amount of expensive layout time involving sine plates, sine bars, height gages, "Jo" blocks and scribing. A certain percentage of this effort is duplicated in setting up the job on the machine, the end-result being a costly finished product. The present unit saves time on various machining operations. For example: Shapers, planers, Kellers, Hydro-tell, broaching machines, vertical and horizontal boring mills, radial drills, surface grinders, many phases of jig and fixture construction, etc. On shapers the machine table is parallel to the path of travel of the cutting tool. So the operator places the unit on the shaper table and quickly "zero-in" the instrument to the machine by rotating the casing 6 with respect to casing 2. Then place the stock in the vise, set the unit on the stock and tilt to the angle required for correct cutting.

On a vertical machine such as a drill press, boring mill and radial drill, the old method demanded that the machine table be moved or the vertical column rotated so that the two components of the machine, the fixed part and the moving part, be set in a certain relation to each other. Then the stock to be machined had to be fastened in the fixed part of the machine at an angle of 90 degrees or less by the use of trigonometry, sine bars, etc. With the present unit the base is placed against the vertical column and quickly "zero-in" by turning the dial casing. Then, disregarding angle of the table in relation to column, fasten material to desired angle obtained by direct reading from the unit and begin operation. Note that three readings can be obtained instantly with the unit. Elevation right or left and included and excluded angles.

The micrometer adjustment screw is a very desirable refinement of the instrument. It allows the setting of angles in relation to other angles with a minimum possibility of error. For example: We have an angle of 13½ degrees. It is necessary to change the angle of the job by adding or subtracting 8 degrees and 20 minutes, or 8⅓ degrees. This computation, though simple, is often the cause of error, resulting in scrapped material. To eliminate this possibility of error, place the unit on the job, which is already tilted to 13½ degrees, and turn the knurled screw until the dial reads exactly 10 degrees. Then the job can be tilted either up or down, subtracting or adding 8⅓ degrees without computing fractions.

The many applications of the unit to the process of inspection are obvious. When the instrument has been "zeroed-in" to a particular surface, any number of angles can be very quickly checked for accuracy. Objects of great size and weight can be placed at an angle or levelled without using lengthy trigonometry methods.

To use the unit as a level we turn the micrometer adjustment until the base is exactly 90 degrees to the plumb-needle and the instrument becomes a very sensitive and accurate level. By means of the set screw 76 located in the center of the rear of the housing it is possible to adjust the sensitivity of the needle to fit any particular job.

I claim:

1. A combination level and angle finding and measuring unit comprising a cylindrical casing having front and back panels, at least the front panel of which is transparent, a plumb needle having one end heavier than the other, pivotally mounted in the casing for rotation in a plane substantially parallel with the plane of the front panel, a protractor scale provided within the casing, said casing being carried by a base member and being rotatable with respect thereto, means carried by the base member to secure the base and casing against respective rotational movement, the base member being elongated and flat on its lowermost surface and provided with upstanding front and back wall members throughout its length, the central portion of the top of each wall member being in the shape of a circular arc to receive the circular casing, the height of the circular arc provided in the back wall being greater than the height of the arc in the front wall, and the back wall being provided with an inwardly projecting flange to engage a circular groove provided around the rear periphery of the cylindrical casing.

2. Unit according to claim 1 wherein the front wall of the base member is provided with retaining screws operable to contact a forwardly projecting flange carried by the circular casing to secure the casing and base against respective rotational movement.

3. Unit according to claim 2 wherein the front and back walls of the base member carry plates bearing a vernier scale, and forwardly and rearwardly projecting circular flanges provided on the casing bear increment inscriptions of at most degree representation.

4. Unit according to claim 1 further comprising a worm gear carried by the base operable to mesh with gearing teeth provided peripherally around the outer surface of the casing, said worm gear being mounted for movement from a gearing teeth engaging position to a disengaging position.

5. Unit according to claim 3 further comprising a circular level tube including level bubble positioned within the casing.

6. Unit according to claim 3 further comprising a bracket secured to the exterior of the back casing panel to receive a scale or ruler.

7. Unit according to claim 3 wherein the plumb needle is pivotally mounted within a U-shaped bracket carried within the casing.

References Cited

UNITED STATES PATENTS

| 306,429 | 10/1884 | Rich | 33—214 |
|---|---|---|---|
| 477,312 | 6/1892 | Rockteacher et al. | 33—215.1 |
| 759,239 | 6/1904 | Clark | 33—102 |
| 1,035,379 | 8/1912 | Miller | 33—215.1 X |
| 1,772,925 | 8/1930 | Wernicke | 33—88 |

FOREIGN PATENTS

| 1,178,962 | 12/1958 | France. |
|---|---|---|
| 10,180 | 1913 | Great Britain. |
| 344,108 | 3/1931 | Great Britain. |
| 245,718 | 9/1947 | Switzerland. |

LEONARD FORMAN, *Primary Examiner.*

HARRY N. HAROIAN, *Examiner.*